Feb. 6, 1940. R. C. SYLVANDER 2,189,375
INDICATING INSTRUMENT
Filed May 15, 1937
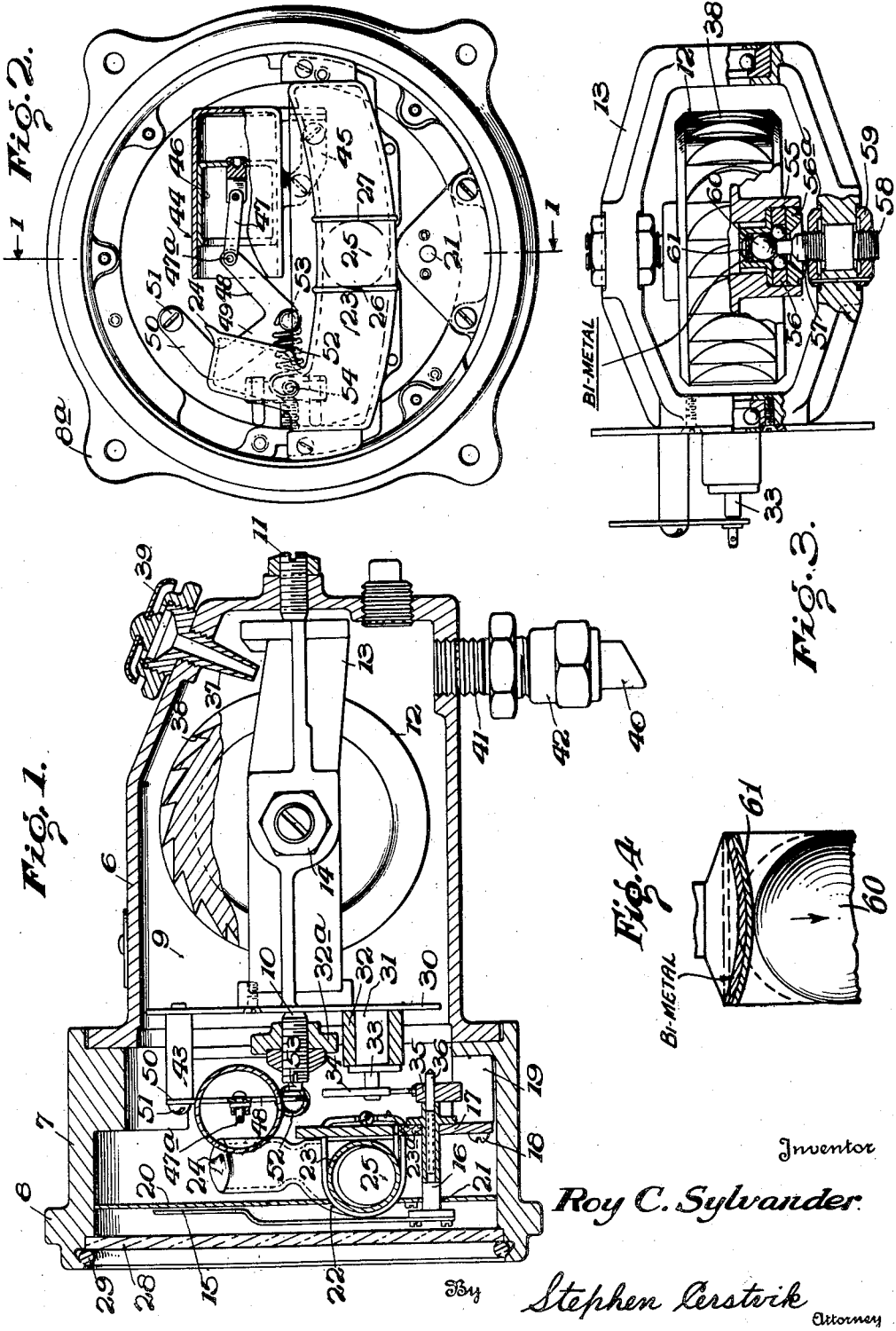
Inventor
Roy C. Sylvander
By Stephen Cerstvik
Attorney Patented Feb. 6, 1940

2,189,375

UNITED STATES PATENT OFFICE 2,189,375

INDICATING INSTRUMENT

Roy C. Sylvander, Garden City, N. Y., assignor to Bendix Aviation Corporation, South Bend, Ind., a corporation of Delaware Application May 15, 1937, Serial No. 142,937

8 Claims. (Cl. 74—5)

The present invention relates to improvements in indicating instruments and more particularly to instruments wherein a rotatable member such as a gyroscope is employed.

Instruments such as rate-of-turn and bank indicators for instance, utilizing a gyroscope as a rotating element and mounted on a mobile object to indicate angular movements thereof must be provided with means for supporting the rotating member for free rotation thereof. At the present time it has become general practice in indicating instruments of the precision type to utilize particular metals or alloys for each of the parts of the device. While such specialization has led to instruments that are more rugged, lighter and more adaptable to precision work in general, it has raised the problem of unequal expansion and contraction of parts upon changes of temperature.

Such unequal expansion and contraction due to temperature changes has led to binding or loosening of the rotating element thereby providing a source of friction or free play of the element and error in the device.

Accordingly, one of the objects of the present invention is to provide novel means whereby the foregoing undesirable characteristics are eliminated.

A further object is to provide novel means in a gyroscopic instrument whereby a proper relationship is maintained between rotatable and stationary parts upon a change in temperature.

Still another object is to provide novel means in a gyroscope whereby binding of the gyro rotor is eliminated.

Another object is to provide novel means in a gyroscope whereby end play between the gyro rotor and its bearings is eliminated.

A still further object is to provide in a gyroscopic instrument novel bearing means between the gyro rotor and its mounting, which shall be free of changes due to temperature effects.

The above and further objects and advantages of the invention will appear more fully hereinafter from a consideration of the detailed description which follows, taken together with the accompanying drawing, wherein is illustrated one embodiment of the invention. It is to be expressly understood, however, that the drawing is for the purpose of illustration and description only and is not designed as a definition of the limits of the invention reference being had for this purpose to the appended claims.

In the drawing wherein like reference characters refer to like parts throughout the several views;

Fig. 1 is a side elevation in section taken on line 1—1 of Fig. 2, of a device embodying the invention;

Fig. 2 is an end elevation of the device as shown in Fig. 1 with the cover glass and dial removed;

Fig. 3 is a plan view partly in section illustrating the gyroscope mounting means; and Fig. 4 is a diagrammatic view illustrating the theory of operation of the bi-metal element.

In the drawing, the present invention is illustrated as applied to a rate-of-turn and bank indicator, although it is to be expressly understood that the invention is not to be so limited but may be applied to any gyroscopic device.

Referring to Fig. 1, the device comprises an air-tight casing 6 which may be of any suitable lightweight material as, for example, cast aluminum, hard rubber or a phenol condensation product, and having an enlarged portion 7 which is provided with an annular flange 8 having ears or lugs 8a for suitably mounting the device on an instrument panel of the mobile object, the angular motion of which is to be indicated, so that the longitudinal axis of the casing will coincide with or lie parallel to the longitudinal axis of the object.

The gyroscope 9 is mounted in any suitable manner within the casing as by means of adjustable pivots or bearings 10 and 11 and includes a rotor 12 journaled in a frame 13 for rotation about a horizontal axis perpendicular to the axis constituted by the pivots 10, 11 in suitable bearings which will be described in detail later, one of which is indicated generally at 14 so that the frame may oscillate about the axis 10, 11 due to the precessional forces acting thereon, when the frame and casing are turned about an axis perpendicular to both of the first-mentioned axes. The rotor and its supporting frame may be arranged, however, in various other positions relative to the longitudinal axis of the casing, and hence the axis of the dirigible object, so that angular motion of said object about any one of its three axes may be indicated as is well understood by those skilled in the art.

The device embodying the present invention may be used on an aircraft, for example, to indicate the turn, bank or longitudinal inclination.

Means are provided for indicating the precessional movements of the gyroscope about the axis 10, 11 and, in the form shown, comprise a suitable pointer 15 carried by a shaft 16 rotably mounted in a supporting member 17 secured to portion 7 of the casing in any suitable manner as, for example, by a screw 18 and a spacer 19. The pointer 15 is arranged to traverse a dial 20 carried by the casing and having opening 21 in the lower portion thereof through which the pointer shaft 16 is adapted to extend. The dial 20 is also provided with a transverse arcuate slot 22 through which a bank indicator may be viewed such, for example, as the ball type which consists of a curved glass vessel 23 filled with suitable damping liquid and sealed as indicated at 24 and having a ball 25 fitting snugly in the curved portion thereof so that upon a bank of the mobile object about the axis 10, 11 said ball will be actuated within the vessel 23 by the force of gravity or by centrifugal force when the mobile object is turned about a vertical axis. The vessel 23 is also secured to the supporting member 17 as by means of a wire 23a.

When the mobile object is banked at the proper angle for a given rate of turn the ball 25 will remain exactly in the center of the arcuate vessel 23, such central position being indicated by reference marks 26 and 27, due to the fact that the centrifugal force at such a time is equal to the force of gravity. A cover 28 of some suitable transparent material such, for example, as glass or clear celluloid, is secured to the front of the casing in a manner known in the art as, for example, by clamping ring 49, the pointer 15 and ball 25 being visible therethrough. The precessional movements of the gyroscope frame 13 may be transmitted to the pointer 15 in any suitable manner as by means of the transmission mechanism including a plate 30 carried by the frame and having a pin 31 secured thereto and encased within a rubber bushing 32 which abuts bridge 32a at the limit of precession said pin 31 having an extension 33 which is adapted to engage a pair of pins 34, carried by a counterweight 35 secured to extension 36 of the pointer shaft 16 on which the pointer 15 is carried.

Means are provided for rotating the rotor 12 about the axis 14 and, in the embodiment illustrated, comprise a nozzle 37 arranged to direct a fluid stream into a plurality of turbine buckets 38 formed on the periphery of the rotor. The fluid may be introduced into the casing 6 and directed against the buckets 38 in any suitable manner as by means of said nozzle 37 the outer end of which is covered though not sealed by a dust cap 39, and may be exhausted from the casing through an outlet pipe 40 secured to the opposite side of the casing as by means of a nipple 41 and a coupling member 42.

It will be apparent that the fluid pressure for driving the rotor may be derived in any suitable manner, as, for example, by connecting the outlet pipe 40 to a Venturi tube (not shown) or to an exhaust pump, or to the intake manifold of the internal combustion engine of the vehicle on which the device is mounted, or a compression pump may be utilized for pumping the fluid into the casing, which fluid may then be exhausted to the atmosphere through the outlet pipe 40.

It is desirable that the gyroscope be returned to normal position after the precessional movement thereof and to this end means are provided in combination with damping means whereby the instrument may be returned to normal position and oscillations and hunting are prevented.

Attached to the plate 30 near the upper part thereof is post 43 which post oscillates or swings back and forth with the precessing gyroscopic element. A dashpot cylinder 44 is carried in fixed relation to the casing 7 by support means 45 (see Fig. 2) and having in this instance its axis horizontally disposed and in parallel relation to the plate 30. A piston 46 reciprocates in the cylinder under the force of the precessing gyroscope. Piston 46 carries a connecting rod 47 pivotally connected to the cylinder at one end thereof and also pivotally connected at 47a to part 48 of a lever arm 48, 49, 50; part 50 thereof being rigidly anchored to post 43 by screw 51. By this structure the movement of the plate 30 or, in other words, the precession of the gyroscope, reciprocates the piston 46 to compress the air in the cylinder 44 on motion in one direction and to cause the formation of a partial vacuum behind said piston on motion in the other direction to steady the precession of the gyroscope.

A continual centralizing effort necessarily must be exerted on the gyroscopic element to return it to zero or normal position immediately the angular motion of the aircraft or vehicle on which the instrument is installed has ceased. For this purpose a centralized spring 52 is connected at one end to the junction of arms 48 and 49 by post 53, and anchored at the other end to post 54. Whenever the gyroscope precesses away from zero position it does so against the resilient force exerted by spring 52 which thereby serves to return the instrument to zero after the angular motion has been completed.

Gyro frame 13 is mounted for rotation about pivots 10, 11 in suitable bearing in the same manner as rotor 12 is mounted in bearings 14 which bearing structure will now be described in detail. The rotor 12 is formed with a hollow hub 55 (see Fig. 3) encasing the roller bearing 56 held in place by retainer 56a, in which bearing is journaled the pivot 57 adjustably mounted in frame 13 by screw threads 58 and nuts 59. Abutting the pivot 57 at one end thereof is the thrust bearing 60.

Rotor 12 may be constructed of brass while frame 13 may be constructed of aluminum or other light metal or material. Thus, upon a change in temperature, the unequal amounts of expansion of the aluminum frame and the brass rotor may cause a binding action between the pivot 57 and the thrust bearing 60.

Means are, therefore, provided in accordance with the present invention whereby binding of the rotor, or end play thereof, due to changes in temperature is eliminated or prevented. For this purpose a bi-metal disc 61 is placed behind thrust bearing 60. The bi-metal disc 61 formed, for instance, of brass and invar or any well known substances used in the construction of bi-metal elements, said materials depending upon the materials used in the rotor and frame, is so constructed that in case of a binding relative contraction of the rotor and frame the disc will contract as shown in dotted lines in Fig. 4 so as to move relatively to the thrust bearing 60 and thereby reduce or eliminate such binding action. Upon a relative expansion between the rotor and frame whereby end play between the pivot and thrust bearing would be introduced, the expansion of the bi-metal disc as shown in the full lines in Fig. 4, will move bearing 60 to take up the play. The bi-metal disc therefore will maintain at all temperatures, a proper bearing relation between the rotatable and stationary parts of the device.

The bearings or pivots 10, 11 are similar to the bearing 14 set out above and thereby any binding action or play between the gyro frame 13 and the casing 7 may also be eliminated.

From the foregoing description it will be seen that novel means have been provided in a gyroscopic instrument whereby binding or play due to changes in temperature is eliminated between the gyro rotor and the frame in which it is journaled.

Although but one embodiment of the invention has been illustrated and described further changes and modifications in form, materials and relative arrangement of parts which will now appear to those skilled in the art may be made without departing from the scope of the invention. Reference is therefore to be had to the appended claims for a definition of the limits of the invention.

What is claimed is:

1. In a device of the character described, a gyro rotor, means supporting said rotor for rotation therein, and a bi-metal element between said rotor and its support, said element assuming positions of varying degrees of concavity upon variation in temperature whereby unequal thermal expansion between said rotor and said support is equalized.

2. In a device of the character described, a gyro rotor, a frame for said rotor, bearing means between said frame and said rotor, and a temperature responsive flat disc assuming positions of varying convexity with changes in temperature to thereby actuate said bearing means to move in the direction opposite to the relative thermal expansion of said frame with respect to said rotor.

3. In a gyroscope including a rotor, a frame, bearing parts for said rotor, one of said parts being movable with thermal expansion of said frame and another of said parts being movable with thermal expansion of said rotor, and a temperature responsive flat disc assuming positions of varying degrees of convexity or concavity with changes in temperature to thereby actuate said bearing parts in the direction opposite to the relative expansion of said frame and rotor.

4. In a gyroscope, a rotor, a frame for said rotor, said rotor comprising a thrust bearing, means connected to and projecting from said frame to said bearing, and a bi-metal element behind said bearing changing its concavity with changes in temperature whereby unequal thermal expansion of said rotor and frame is compensated.

5. In a device of the character described, a gyro rotor, a frame therefor, bearing means between said rtoor and said frame, a support for rotatably supporting said frame, bearing means in said support, and a bi-metal element in contact with each of said bearing means and assuming positions of varying concavity or convexity with changes in temperature whereby unequal expansion of the parts with changes in temperature is compensated.

6. In a gyroscope, a rotor, a frame for said rotor, bearing means in said rotor and frame whereby said rotor is rotatably supported by said frame, said bearing means comprising separate parts movable with said rotor and frame, respectively, upon expansion or contraction thereof, and a temperature responsive flat bi-metal disc between said separate parts assuming positions of varying degrees of convexity to thereby actuate said movable parts whereby their relative movement with changes in temperature is eliminated.

7. In a device of the class described, a rotor, a frame, a bearing comprising a first part and a second part, said first part being movable relative to said second part upon relative thermal expansion of said frame and rotor, and a bi-metal disc located behind one of said parts and assuming positions of varying concavity with changes in temperature to move the same whereby said relative movement is reduced.

8. In a device of the class described, a rotor, a frame, bearing means located between said rotor and said frame and comprising projecting means and co-acting receiving means, means intermediate said projecting and receiving means, said projecting means being movable relative to said receiving means upon expansion of said frame, and a bi-metal disc assuming various positions of concavity with changes in temperature to actuate said intermediate means in a direction opposite to the relative movement of said projecting means with respect to said receiving means.

ROY C. SYLVANDER.